United States Patent [19]

Petrik

[11] 4,132,001
[45] Jan. 2, 1979

[54] DIRECT READING RADIUS GAUGE

[76] Inventor: Konrad Petrik, 205 Meadowlawn Rd., Cheektowaga, N.Y. 14225

[21] Appl. No.: 847,770

[22] Filed: Nov. 2, 1977

[51] Int. Cl.² .......................... G01B 5/08; G01B 3/18
[52] U.S. Cl. .................................... 33/178 D; 33/167
[58] Field of Search .............................. 33/167, 178 D

[56] References Cited

U.S. PATENT DOCUMENTS

| 1,971,628 | 8/1934 | Sutterlin | 33/178 D |
| 2,572,999 | 10/1951 | Elliott | 33/178 D |
| 3,128,559 | 4/1964 | Winter | 33/167 |

FOREIGN PATENT DOCUMENTS

| 455963 | 2/1928 | Fed. Rep. of Germany | 33/178 D |
| 926446 | 4/1947 | France | 33/178 D |
| 6566 of | 1914 | United Kingdom | 33/178 D |
| 487375 | 6/1938 | United Kingdom | 33/178 D |

Primary Examiner—Richard R. Stearns
Attorney, Agent, or Firm—Sommer & Sommer

[57] ABSTRACT

A direct reading radius gauge includes a Y-shaped frame having a base and two divergent legs, and a micrometer head having its spindle arranged to penetrate an opening provided through the frame base portion. Values are imputed to the cooperative scale elements on the micrometer. The micrometer is calibrated to indicate zero when the spindle end face includes the line of intersection between two facing convergent planar surfaces on the legs. When the leg planar surfaces and the spindle end face contact an object's surface of revolution, the micrometer scale will indicate directly the radius of such surface.

2 Claims, 6 Drawing Figures

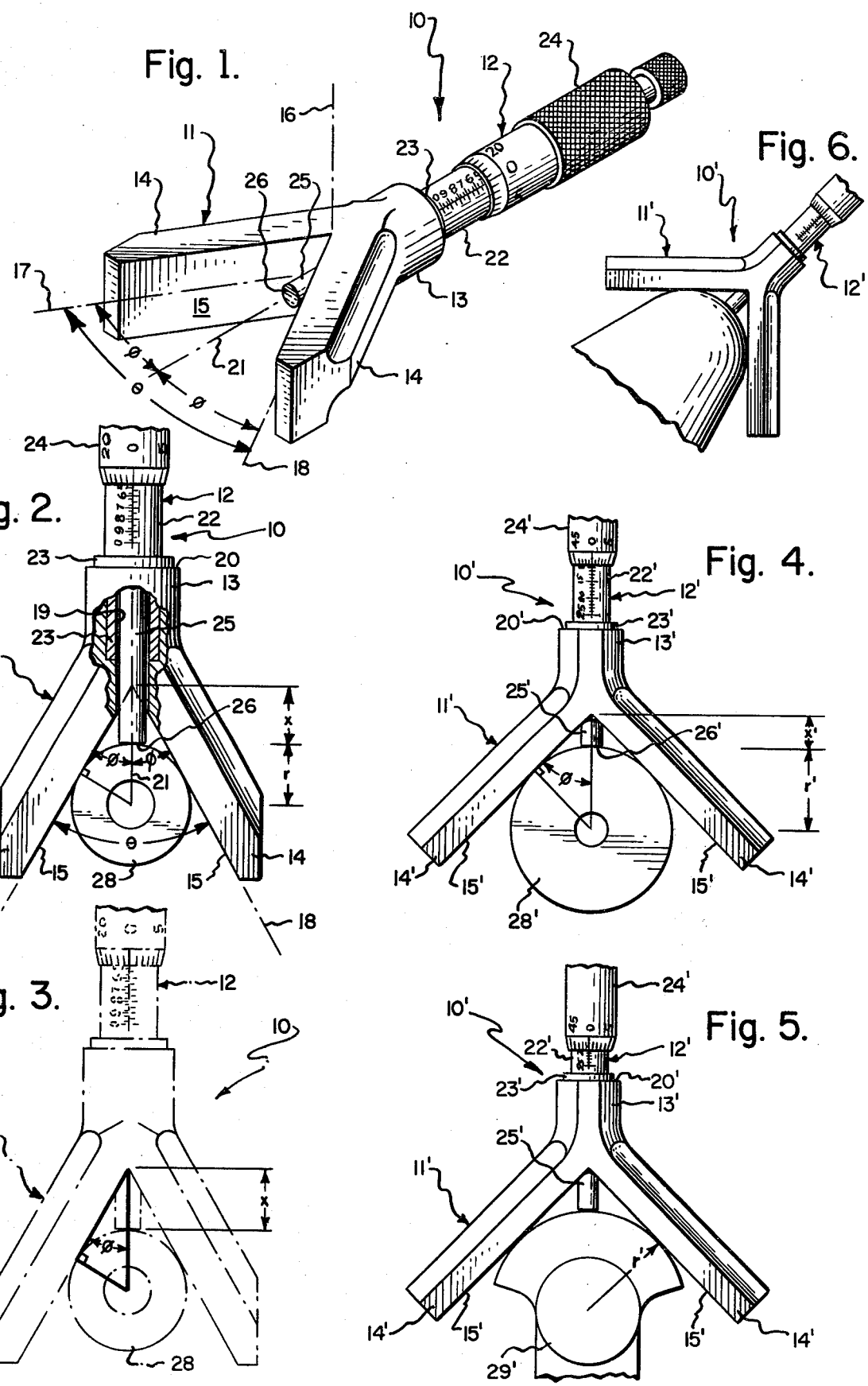

DIRECT READING RADIUS GAUGE

BACKGROUND OF THE INVENTION

There is often a need to measure the radius of an object, such as a cylinder or a sphere.

Upon information and belief, the conventional way to measure such radii is to measure the diameter of the object with micrometer calipers, and thereafter halve such measured diameter.

Also, upon information and belief, there is a further need to measure the radius of an outside rounded corner, and the radius of a segment of a surface of revolution. There is not believed to be any instrument capable of reading directly such radii.

The most pertinent prior art references known to applicant are U.S. Pat. No. 1,401,119 (Aldeborgh) and U.S. Pat. No. 2,658,911 (Giambiasi). Aldeborgh appears to disclose a diameter gauge having a frame provided with a V-shaped recess and a deviation indicator associated therewith. Hence, Aldeborgh's device is used to indicate deviation from a desired value. Giambiasi discloses a gauge for measuring the taper of a conical object, or the diameter of a cylindrical or spherical object. This reference discloses apparatus having a substantially Y-shaped frame associated with an arm-type deviation indicator. However, there does not appear to be any prospective teaching in Giambiasi that the angle of divergence between the frame legs should be critically related to the scale of a selected micrometer head.

SUMMARY OF THE INVENTION

The present invention relates generally to the field of measurement devices, and more particularly to improved apparatus for indicating directly the radius of an object in a desired system of measurement.

The improved apparatus broadly comprises a Y-shaped frame and a micrometer head. The frame has a base and two divergent legs extending outwardly therefrom. Each of these legs has a planar surface arranged to face the other of the legs. These planar surfaces intersect in a line perpendicular to the longitudinal extent of each leg. The base has a cylindrical opening therethrough, and the axis of this opening is arranged to intersect the line of intersection and arranged to bisect the angle of divergence between the planar surfaces.

The micrometer head has a sleeve mounted on the frame base about the opening, has a spindle associated with the sleeve and thimble and operative to move axially of said opening in response to rotational movement of the thimble relative to the sleeve. The spindle has a planar end face positioned perpendicularly of the axis of the opening. The sleeve and thimble have cooperative scale elements representative of the numerical quantity to be measured. These scale elements read zero when the line of intersection of the planar surfaces lies in the plane of the spindle end face.

The sine of the angle of divergence between the two planar surfaces is substantially equal to twice the amount of a known radius divided by the amount of the known radius plus the amount of the extent of axial displacement of the spindle end face beyond the line of intersection when the cooperative scale elements indicate the numerical value of the known radius.

Thereafter, the cooperative scale elements will indicate the numerical value of an unknown radius of an object when the planar surfaces and the spindle end face each contact the surface of revolution of the object.

Accordingly, one object of the present invention is to provide improved apparatus adapted to indicate directly the numerical value of the radius of an object in a desired system of measurement.

Another object is to provide improved apparatus capable of measuring the radius of an outside corner.

Still another object is to provide improved apparatus capable of measuring the radial depth of a keyway or slot, for example, extending into a body from a surface of revolution.

Another object is to provide apparatus capable of measuring the radius of a segment of a surface of revolution, such as a crankshaft counterweight.

These and other objects and advantages will become apparent from the foregoing and ongoing written specification, the drawings, and the appended claims.

BRIEF DESCRIPTION OF THE DRAWINGS

FIG. 1 is a perspective view of a first preferred form of the inventive apparatus, this view particularly showing the Y-shaped frame and the micrometer head.

FIG. 2 is a fragmentary top plan view of the apparatus shown in FIG. 1, with a portion broken away to illustrate the micrometer head spindle penetrating the base opening.

FIG. 3 is a view similar to FIG. 2, but showing the apparatus and a cylindrical object being measured in phantom to more clearly illustrate the right triangle by which the angle of divergence may be calculated.

FIG. 4 is a fragmentary top plan view of a second preferred of the apparatus, this view showing such apparatus as directly indicating the radius of an object.

FIG. 5 is a fragmentary top plan view of the apparatus shown in FIG. 4, this view showing the apparatus in use to measure the radius of a segmented surface of revolution on a crankshaft.

FIG. 6 is a fragmentary top plan view showing the second preferred form of the apparatus in use to measure the radius of an outside corner.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the several drawing figures, and more particularly to FIG. 1 thereof, the present invention broadly provides improved apparatus, of which a first preferred embodiment is generally indicated at 10, which is particularly adapted for use in indicating directly the numerical value of the radius of an object's surface of revolution in a desired system of measurement. Persons skilled in this art will recognize that the two most commonly encountered systems of measurement are the English system, in which distance may be measured in inches, and the metric system, in which distance may be measured in millimeters. However, while the present invention is particularly useful for directly indicating the unknown radius of an object, the inventive apparatus may find other useful applications as well.

Moreover, as used herein, the term "radius" is intended in its broadest sense to mean a straight line from the center of a surface of revolution to the curvature thereabout. Persons skilled in this art will appreciate that the most common three-dimensional objects having radii are the cylinder and sphere, or segments thereof, although this list is illustrative only and not intended to be exhaustive of all objects and shapes having radii.

FIRST PREFERRED EMBODIMENT (FIGS. 1-3)

Referring now to FIGS. 1 and 2, the first preferred embodiment of apparatus 10 is shown as broadly including a Y-shaped frame, generally indicated at 11, and a micrometer head, generally indicated at 12.

As best shown in FIG. 2, the Y-shaped frame 11 includes an upper base 13 and two divergent legs, severally indicated at 14, extending downwardly and outwardly therefrom. Each of legs 14, 14 is shown as having a planar surface 15 arranged to face the other leg. Adverting now to FIG. 1, these two planar surfaces 15, 15 intersect in a straight line, numbered 16, perpendicular to the longitudinal extent of each leg. To make explicit that which is implicit, the longitudinal extent of the two legs is parallel to imaginary lines 17, 18 in the plane of planar surfaces 15, 15. Hence, the line of intersection 16 between planar surfaces 15, 15 is perpendicular to each of imaginary lines 17, 18.

As best shown in FIG. 2, the frame base 13 is provided with a cylindrical through hole or opening 19 which communicates the base upper annular surface 20 with planar surfaces 15, 15. This base opening 19 has an axis, indicated by centerline 21, which is arranged to intersect the line of intersection 16 and bisect the angle of divergence $\theta$ between planar surfaces 15, 15. Hence, in FIG. 2, the angle of divergence $\theta$ is bisected by a downward extension of base opening centerline 21, and the angle between line 21 and either planar surface is indicated by the symbol $\phi$. Thus, angle $\theta$ is twice angle $\phi$.

Still referring to FIGS. 1 and 2, the micrometer head 12 is of conventional design and is of the type employed in depth gauges, in that the scale reads higher as the spindle is extended. This micrometer head 12 is shown as having a tubular sleeve 22 secured to the frame base 13 about opening 19 by means of a member 23 pressfitted into opening 19, having a thimble 24 rotatably mounted on the sleeve, and having a cylindrical spindle 25 associated with the sleeve and thimble and operative to move axially of body opening 19 in response to rotational movement of the thimble relative to the sleeve in the appropriate angular direction. This spindle 25 is further shown as having a circular end face 26 arranged in a plane perpendicular to spindle axis 21. In this manner, the spindle end face 26 is mounted for movement along spindle axis 21 both toward and away from the line of intersection 16. The sleeve and thimble are shown provided with cooperative numerical scale elements. Specifically, the sleeve has imprinted thereon a series of numbered graduations increasing from zero to ten as the base 13 is approached. These numbered sleeve graduations are subdivided into quarters by appropriately positioned intermediate marks, and the thimble is shown as having twenty-five numbered ticks spaced circumferentially thereabout. Hence, these cooperative scale elements on the sleeve and thimble are read by adding the indicated thimble number (in thousandths) to the indicated sleeve number (in hundredths). As an example of this, the cooperative scale elements read 0.500 in FIGS. 1 and 2. Inasmuch as this type of micrometer head, per se, is individually old, no attempt is made herein to claim this mechanism by itself, but only in association with the improved frame.

It should be noted that the micrometer head should be calibrated to read zero when the spindle has been retracted such that the plane of spindle end face 26 will include the line of intersection 16.

In all embodiments of the inventive apparatus, the angle of divergence $\theta$ is related to the scale and system of measurement of the micrometer head, as discussed below.

By way of illustration, the micrometer head 12 depicted in FIGS. 1-3 was originally intended to read in inches. Thus, the scale on the micrometer reads from zero to one inch, and the sleeve numbers represent tenths of an inch. Once the appropriate micrometer head has been selected and an appropriate range imputed to its numbered scale (i.e., the sleeve numbers are designated to represent tenths of an inch in FIGS. 1-3), then the angle of divergence $\theta$ may be calculated by considering what the micrometer should read if a cylindrical object, indicated at 28, having a known radius r, was being measured.

Referring now to FIG. 3, assume that the radius of test cylinder 28 is one-half inch (0.500 in.). To directly read the radius of object 28, the micrometer scale should indicate the number 0.500, as shown. At this indicated reading, the spindle end face 26 would have been extended for one-half inch below line of intersection 16 when such spindle end face contacts the outer surface of object 28. When the outer surface of object 28 contacts both leg planar surfaces 15, and when this object outer surface is itself contacted by spindle end face 26, angle $\phi$ may be calculated. The sine of angle $\phi$ would be equal to the opposite side (r) divided by the hypotenuse (r + x) of a right triangle. As an alternative method of calculation, it is pointed out that the cosecant of angle $\phi$ would be equal to the hypotenuse (r + x) divided by the opposite side (r). In the illustrated example wherein r = 0.500 inches and x = 0.500 inches, the sine of angle $\phi$ would be 0.500. Hence, angle $\phi$ would be thirty degrees and angle $\theta$ would be sixty degrees, for this particular micrometer head.

It should be noted that while the numbered graduations on micrometer head 12 were originally intended to read in tenths of an inch, different values may be imputed to these numbered graduations to vary the range of the apparatus, as desired, so long as angle $\theta$ is correspondingly changed. The point being made is that one can arbitrarily impute values to the absolute numbers of the micrometer scale to provide a desired range, and thereafter calculate the necessary angle of divergence $\theta$ between the leg planar surfaces 15, 15. In this regard, one could impute to the micrometer scale shown in FIGS. 1-3, a range of from zero to ten millimeters, and calculate the angle of divergence $\theta$ knowing that distance x would be 0.500 inches when the micrometer scale indicated 5.00 millimeters.

The first embodiment 10 of the inventive apparatus could also be used to measure the radial depth of a keyway extending into a body from a surface of revolution. Hence, an operator could measure the radius of said surface, and thereafter measure the depth of the keyway, the difference between these two values being the radial depth of such keyway. However, it is pointed out that only such apparatus having a one to one ratio of spindle travel to micrometer reading can be used to measure such radial keyway depth.

SECOND PREFERRED EMBODIMENT (FIGS. 4–6)

The second preferred embodiment of the improved apparatus includes correspondingly numbered parts, portions and surfaces as the first embodiment, and the structure of the second embodiment is indicated by the prime of the corresponding reference numeral used in association with the first embodiment. Hence, the frame of the second embodiment is generally indicated at 11′, and so forth.

The second embodiment 10′ differs from the first embodiment 10 in that the micrometer head 12′ was intended for metric measurement and has a normal scale range of from zero to twenty-five millimeters. However, to illustrate the principle of operation, assume that the desired range of the micrometer scale is arbitrarily selected to be from zero to two and one-half inches. Hence, scale number 10 indicates 1.00 inch, scale number 15 indicates 1.5 inches, and so forth. In FIGS. 4 and 5, this desired range has been indicated by placing a decimal point between the first and second numbers on the micrometer sleeve numbers.

Knowing that the micrometer head 12′ was originally intended to read in millimeters, angles $\phi'$ and $\theta'$ may now be calculated by considering what the micrometer scale should read if an object 28′ of known radius r′ was being measured. Assume that the radius r′ of object 28′ is one inch. To directly read the numerical value of this known radius, the micrometer scale should read 1.0. At this reading, the distance x′ would be 0.3937 inches, since ten millimeters or one centimeter equals this value in inches. Thus, angle $\phi'$ may be calculated since the length of this opposite side (r′) and the length of the hypotenuse (r′ + x′) are both known. The cosecant of angle $\phi'$ would be equal to the length of the hypotenuse divided by the length of the opposite side, or cosecant $\phi'$ = 1.3937/1.000 = 1.3937, or $\phi'$ = 45°50′58″. Since the angle of divergence $\theta$ is equal to twice angle $\phi'$, $\theta'$ = 91°41′56″. One advantage of using metric micrometer 12′ and imputing a range of from zero to two and one-half inches to its scale, is that angle $\theta'$ will be greater than ninety degrees. This is particularly desirable since it affords the additional capability of use in reading the radius of an outside corner, as shown in FIG. 6. However, it should be pointed out that one could impute any desired range to the micrometer scale, the angle of divergence $\theta'$ being adjusted accordingly.

In FIG. 5, the apparatus 10′ shown in FIG. 4 is depicted as being in use to measure directly the radius of cylindrical segment of a crankshaft 29′.

Various changes and modifications are within the contemplated scope of the inventive apparatus. For example, a dial indicator, preferably of long range, could be substituted for the micrometer head, and such apparatus could be used to check the roundness of an object. Secondly, any of a large number of different micrometer heads, originally intended to read in either the English or metric system, may be selected. After desired values have been imputed to its numerical scale graduations to establish a range of measurement, the angle of divergence may be calculated in the manner heretofore illustrated and described. Thereafter, to directly measure the unknown radius of an object, the apparatus need only be positioned such that both leg planar surfaces and the micrometer spindle end face engage the object's surface of revolution. Once so positioned or operated, the micrometer scale will indicate directly the numerical value of the radius of the object in the desired system of measurement.

If desired, the inventive apparatus may be further modified to measure the radius of relatively large objects. In this modification, the planar surfaces need not be continued to the line of intersection. Rather, such surfaces may be connected by an intermediate web, and the micrometer scale calibrated to read zero when the spindle end face is flush with the web. While this embodiment might afford the capability of reading the radii of relatively large objects, it is believed that its range of measurement will be relatively small.

Of course, various additional changes and modifications achieving like objects and advantages, may be made, without departing from the spirit of the invention which is defined by the following claims.

What is claimed is:

1. Apparatus adapted to indicate directly the numerical value of the radius of an object in one of the English and Metric systems of measurement, comprising:
    a Y-shaped frame including a base and two divergent legs extending outwardly therefrom, each of said legs having a planar surface arranged to face the other of said legs, said planar surfaces intersecting in a line perpendicular to the longitudinal extent of each leg, said base having a cylindrical opening therethrough, the axis of said opening being arranged to intersect said line of intersection and arranged to bisect the angle of divergence between said planar surfaces; and
    a micrometer head originally intended to read in the other of said English and Metric systems of measurement and having a sleeve mounted on said base about said opening, having a thimble rotatably mounted on said sleeve, and having a spindle associated with said sleeve and thimble and operative to move axially of said opening in response to rotational movement of said thimble relative to said sleeve, said spindle having a planar end face perpendicular to the axis of said opening, said sleeve and thimble having cooperative numerical scale elements representative of numerical quantities to be measured, said scale elements reading zero when said line of intersection lies in the plane of said spindle end face; and wherein
    the angle of divergence is selected such that the sine of half of said angle of divergence between said planar surfaces is substantially equal to the amount of a known radius divided by the amount of said known radius plus the amount of the extent of axial displacement of said spindle end face beyond said line of intersection when said cooperative scale elements indicate the number of said known radius.

2. The apparatus as set forth in claim 1 wherein the intended range of said scale elements is from zero to twenty-five millimeters, and wherein said angle of divergence is substantially 91°41′56″.

* * * * *